(12) United States Patent
Cortland et al.

(10) Patent No.: US 11,423,770 B2
(45) Date of Patent: Aug. 23, 2022

(54) CONTROL DEVICES FOR CONTROLLING OUTPUT DEVICES IN A USER ENVIRONMENT

(71) Applicant: The Cauldron London Ltd., London (GB)

(72) Inventors: Matthew Cortland, London (GB); Lyudmil Yordanov Atanasov, Loughton (GB); Tanat Kriengkomol, London (GB)

(73) Assignee: The Cauldron London Ltd., London (GB)

( * ) Notice: Subject to any disclaimer, the term of this patent is extended or adjusted under 35 U.S.C. 154(b) by 0 days.

(21) Appl. No.: 17/187,994

(22) Filed: Mar. 1, 2021

(65) Prior Publication Data

US 2021/0272446 A1  Sep. 2, 2021

Related U.S. Application Data

(60) Provisional application No. 62/983,215, filed on Feb. 28, 2020.

(51) Int. Cl.
*G08C 17/02* (2006.01)
*B67D 1/08* (2006.01)
*G06F 3/044* (2006.01)

(52) U.S. Cl.
CPC .......... *G08C 17/02* (2013.01); *B67D 1/0888* (2013.01); *G06F 3/044* (2013.01)

(58) Field of Classification Search
CPC ........ G06F 3/044; B67D 1/0888; G08C 17/02
See application file for complete search history.

(56) References Cited

U.S. PATENT DOCUMENTS

| | | | | |
|---|---|---|---|---|
| 9,652,962 B1* | 5/2017 | Bulumulla | ............. | G08B 21/22 |
| 2008/0246599 A1* | 10/2008 | Hufton | ................. | G08B 21/245 |
| | | | | 340/529 |
| 2008/0259552 A1* | 10/2008 | Calvarese | ............... | G06F 1/163 |
| | | | | 361/737 |
| 2010/0125362 A1* | 5/2010 | Canora | ................ | G06Q 20/321 |
| | | | | 235/487 |
| 2012/0085741 A1* | 4/2012 | Holverson | ............. | G06Q 50/04 |
| | | | | 219/136 |
| 2015/0227245 A1* | 8/2015 | Inagaki | ................... | G06F 1/163 |
| | | | | 345/173 |
| 2018/0228128 A1* | 8/2018 | Gibbs | ................... | A01M 29/16 |

FOREIGN PATENT DOCUMENTS

JP    2007233737 A    9/2007

* cited by examiner

*Primary Examiner* — Thomas D Alunkal
(74) *Attorney, Agent, or Firm* — Flaster Greenberg, P.C.

(57) ABSTRACT

A system may enable control of one or more output devices in response to input received from one or more activators. An activator may transmit a unique identifier that corresponds to the output device to be controlled. A control unit may receive the unique identifier and enable control of the output device in response to one or more additional inputs. The inputs may be provided by a flex sensor or capacitive touch sensor of a wearable device. In response to the additional inputs, control may be permitted for the output device identified by the unique identifier of the activator.

15 Claims, 12 Drawing Sheets

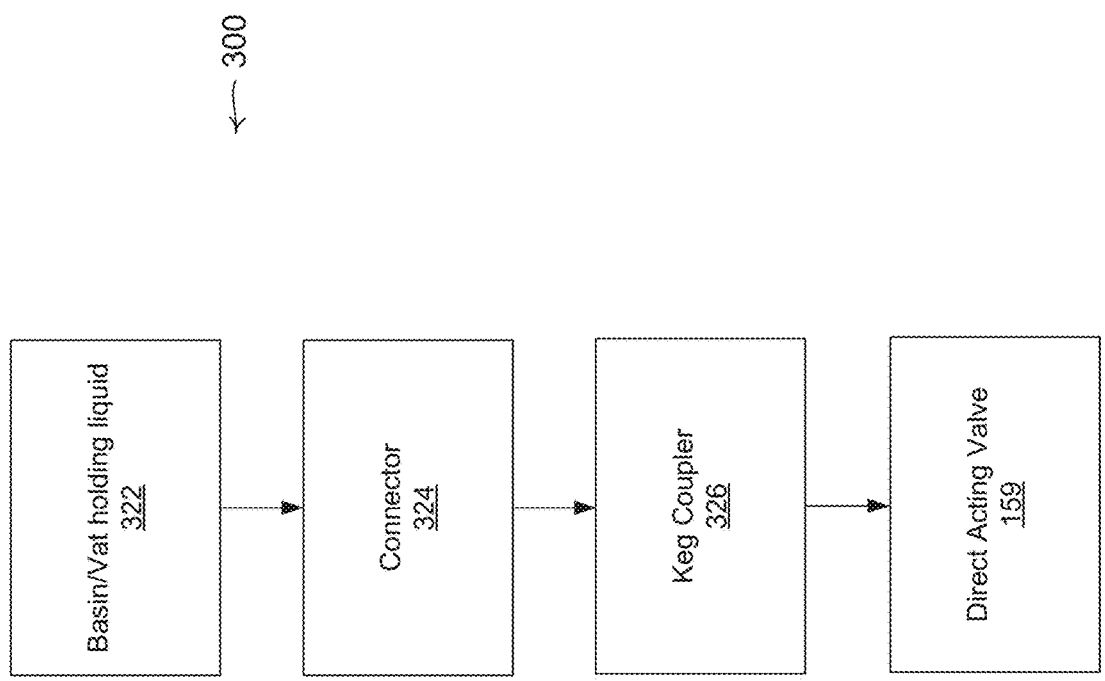

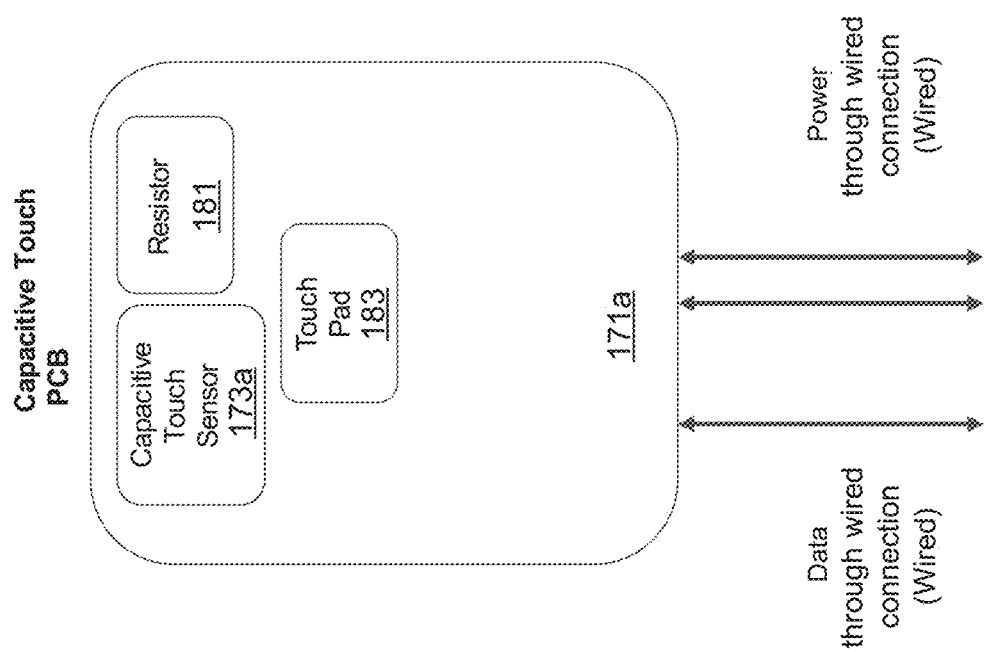

CONTROL DEVICES FOR CONTROLLING OUTPUT DEVICES IN A USER ENVIRONMENT

CROSS-REFERENCE

This application claims the benefit of U.S. Provisional Application No. 62/983,215, filed Feb. 28, 2020, the entire contents of which are incorporated by reference herein.

BACKGROUND

In recent years there has been a wave of innovation in Internet of Things (IOT) technology for consumer use. The growing popularity of home assistants, as well as home automation systems mean that this technology is reaching a mainstream audience. Now more than ever, a person can control aspects of the home using a smartphone, voice command, or gesture.

Radio frequency identification (RFID) and near-field communication (NFC) technology has been implemented in various products and systems. RFID and NFC uses range from tracking of good and items to processing payments. RFID and NFC technology, however, can be utilized to improve various elements of IOT technology to control aspects of a user's environment.

SUMMARY

A system is disclosed herein that can control aspects of a user's environment based on short-range communication signals received from a user control device. The system may include a control device capable of receiving input from one or more activators in order to control one or more output devices. The control device may include a wearable control unit capable of receiving a unique identifier from a first activator. The unique identifier may be a radio frequency identifier (RFID) that identifies the output device to be controlled. The first activator may comprise magnets for attaching to the wearable control unit. The wearable control unit may include magnets configured to generate an electrical current when within proximity to the magnets of the first activator and illuminate one or more LEDs on the first activator to provide feedback to a user that the RFID has been received by the wearable control unit.

The wearable control unit may receive the RFID from the first activator as a first input for performing control of an output device. The wearable control unit may receive an input from one or more flex sensors to perform control of the output devices. The flex sensors may provide an indication to a processor of the wearable control unit that they have been flexed past a predefined threshold for performing control. The flex sensors may be located in multiple finger portions of a wearable glove and the flex value received from each of the flex sensors may be averaged to determine whether the predefined threshold has been met or exceeded. When the predefined threshold has been met or exceeded, control instructions may be transmitted via a wireless transceiver to the output device that corresponds to the unique identifier received from the first activator. In an example, the output device may be a dispenser that is configured to pour a liquid in response to the control instructions.

The wearable control unit may receive an input from one or more capacitive touch sensors to perform control of the output devices. The capacitive touch sensors may provide an indication to the processor of the wearable control unit to perform control in response to the capacitive touch sensors being touched by the user. The capacitive touch sensors may be located on opposite sides of a wearable hat or headgear of the user. When the capacitive touch has been detected at each of the capacitive touch sensors, control instructions may be transmitted via a wireless transceiver to the output device that corresponds to the unique identifier received from the first activator. In an example, the output device may be a drink dispenser that is configured to pour a liquid in response to the control instructions.

A stationary control unit may be configured to receive the first activator for receiving the RFID for the output device to be controlled. The stationary control unit may receive an input from a second activator for performing control of the identified output device. The input may be a second RFID that is detected by an RFID reader at the stationary control unit. The stationary control unit may perform control while the second RFID is being received at the stationary control unit. The stationary control unit may transmit a message to the output device that is configured to cause the output device to stop performing control when the second RFID is no longer received, or is no longer received above a predefined signal strength.

The stationary control unit may receive the second input from the second activator in the form of a magnetic field. The stationary control unit may comprise an input receiving unit capable of measuring a strength of the magnetic field as the second activator moves closer to the stationary control unit. For example, the input receiving unit may include a Hall effect sensor. After the magnetic field is detected at a strength above a predefined threshold, the stationary control unit may begin performing control of the output device that corresponds to the unique identifier received from the first activator. The stationary control unit may transmit a message to the output device that is configured to cause the output device to stop performing control when the strength of the magnetic field falls below the predefined threshold.

The stationary control unit may receive a third input from a third activator. The third input may be an RFID or other unique identifier associated with a user. The RFID that is associated with the user may be transmitted by the stationary control unit to a cloud management system to determine a level of access associated with a user that corresponds to the output device indicated by the RFID received from the first activator. If the user has access to control the output device, the stationary control unit may enable control of the output device by the second activator.

The first activator may be interchangeable. For example, a first activator that is attached to the wearable control unit or the stationary control unit may be removed, and another first activator may be attached in its place. Each first activator may be associated with a unique identifier, such as an RFID or other serial number. The wearable control unit or the stationary control unit may receive the unique identifier from the first activator when the first activator is attached via short-range communication signals (e.g., radio frequency (RF) signals). For example, the wearable control unit or the stationary control unit may receive the unique identifier via RFID. The control system may implement a cloud management system for tracking user access to output devices and user privileges.

BRIEF DESCRIPTION OF THE DRAWINGS

FIG. 3B is a block diagram illustrating an example system that includes a direct acting valve that may be used to dispense a liquid using gravity.

FIG. 5B is a block diagram illustrating an example configuration of a capacitive touch sensor mounted to a capacitive touch PCB.

DETAILED DESCRIPTION

Figure 1:
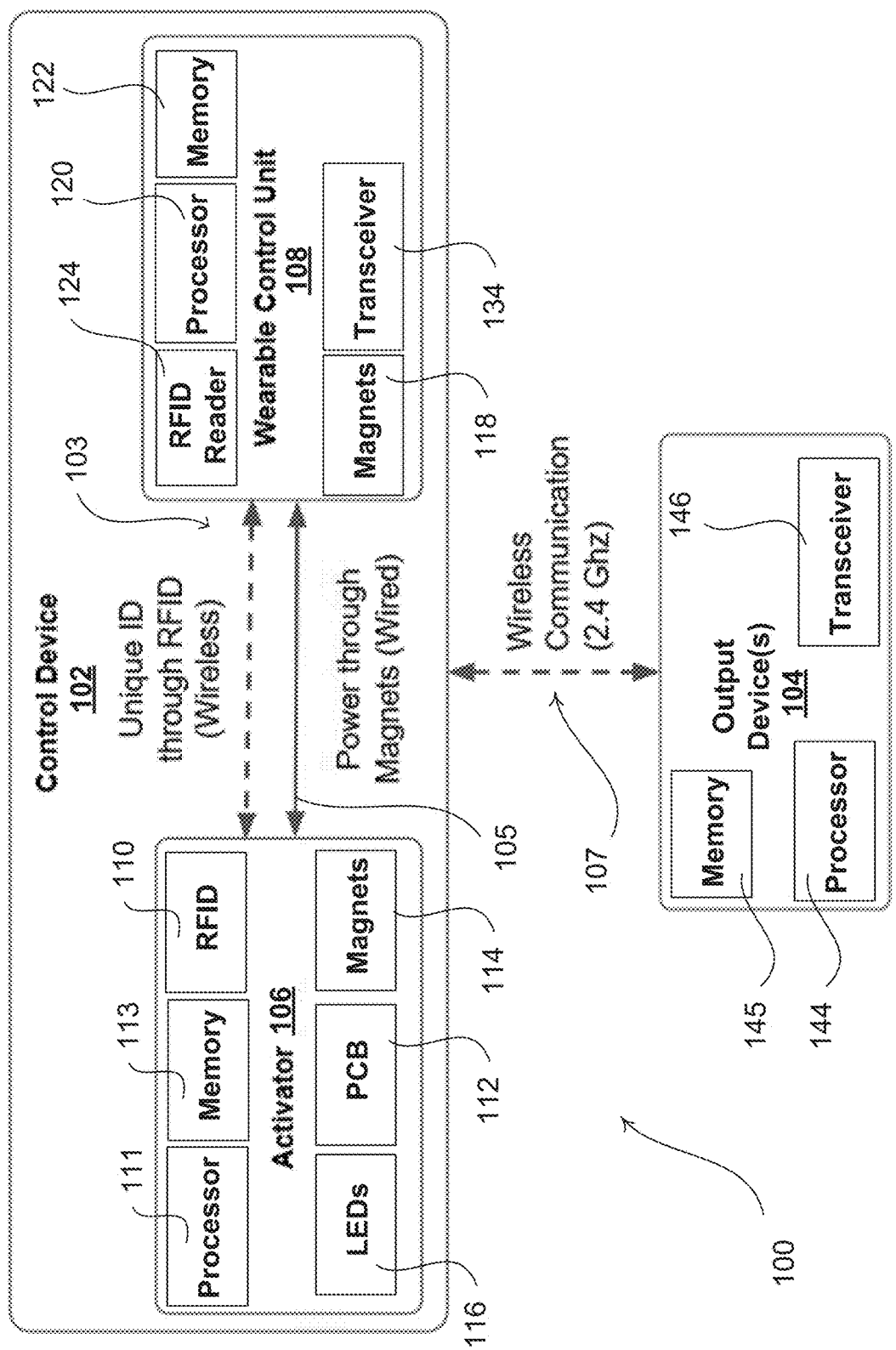
FIGS. 1 and 2 are block diagrams that illustrate example systems including devices for controlling output devices.

FIG. 1 is a block diagram illustrating an overview of a control system 100. The control system 100 comprises a control device 102 and an output device 104. The control device 102 may comprise a wearable control device, such as a glove, a hat, a helmet, a chest plate, an arm band, a ring, or another wearable control device. The control device 102 may include a wearable control unit 108 configured to perform different types of control at the output device 104 in response to different activators 106 being detected by the wearable control unit 108.

The control device 102 comprises an activator 106 and the wearable control unit 108. The activator 106 may comprise a unique identifier capable of being communicated to the wearable control unit 108 via a wireless communication link 103. The unique identifier may be a radio frequency identifier (RFID) transmitted from an RFID tag 110 or another unique identifier stored in memory (on the RFID tag or otherwise in memory 113 in the activator 106). The activator 104 may be configured to pass the unique identifier from the RFID tag 110 wirelessly to the wearable control unit 108 via the RFID reader 124 or another wireless transceiver of the wearable control unit 108 when the wireless signals are detected above a predefined signal strength. The wireless communication link 103 may be a short-range wireless communication link. For example, the wireless communication link 103 may be a near-field communication link or another short-range radio frequency (RF) communication link. The unique identifier may indicate to the wearable control unit 108 the output device or devices 104 to be controlled. Different activators may comprise a different unique identifier for being transmitted to the wearable control unit 108 for controlling different output devices 104. For example, each activator 106 may comprise an embedded RFID tag 110, which has a unique identifier associated with the activator 106.

The activator 106 may comprise a printed circuit board (PCB) 112 and one or more embedded magnets 114, which may be used to receive power from one or more magnets 118 of the wearable control unit 108. The magnets 114 may be powered by the magnets 118 being moved around a coil wire 105. The magnets 114 of the activator 106 may be exposed to snap into a wired connection to the magnets 118. The coil wire 105 may transfer electrical current to provide power to the activator 106. For example, the electrical current may be used to provide power to one or more light-emitting diodes (LEDs) 116. The power may be controlled using one or more resistors on the PCB 112. In another example, the power may be provided wirelessly through magnetic induction (e.g., via the NFC signals). The magnets 114 and 118 may each comprise magnetic coils configured to communicate the unique identifier wirelessly via NFC and the magnetic induction may be used to provide the power to the activator 106. The magnetic field that is passed to the activator 106 may illuminate the LEDs 116 inside the activator 106 through the PCB 112 inside the activator 106 to provide feedback to a user that the unique identifier is being passed or has been passed to the wearable control unit 108. When the activator 106 is removed from the wearable control unit 108, such that the activator fails to receive a strong enough signal to provide power to the LEDs 116, the LEDs 116 may cease illumination to indicate that the activator 106 has been removed and the unique identifier is no longer being transmitted for activating control of one or more output devices 104.

The wearable control unit 108 may be activated for performing control at the one or more output devices 104 in response to the detection of the unique identifier from the activator 106. When the wearable control unit 108 is activated for performing control, the wearable control unit 108 may transmit a message to connect to or activate the corresponding output device 104. The wearable control unit 108 connecting to or activating the output device 104 may allow the output device 104 to be controlled. Each output device 104 may receive a first message from the wearable control unit 108 to be activated in response to the unique identifier being received from the activator 106 and then perform control in response to subsequent control instructions in another message. In another example, a single message may be used to connect to/activate the output device and perform control. When a unique identifier of a different activator 106 is detected by the wearable control unit 108, the wearable control unit 108 may use the unique identifier to perform a different type of control of an output device 104. The wearable control unit 108 may comprise a processor 120 and memory 122 that has stored thereon unique identifiers of the different activators 106 and the control instructions may be accessed from the memory 122 for performing control at the output devices 104. The control may be performed by the wearable control unit 108 of the user control device 102 passing the control instructions via a wireless communication link 107 to the one or more output devices 104. In another example, the activator 106 may comprise a processor 111 for accessing a memory 113, having stored thereon the control instructions for performing control at the output devices 104. In an example, each activator 106 may comprise a different unique identifier that activates a different valve for pouring liquid, an electrical motor for dispensing solids or performing other control, a lighting load, a door lock, a magnetic stirring mechanism, a water vaporizer, a fog machine, a pump, a linear actuator, an auger, a servo, a speaker, or another output device capable of being controlled. The output devices 104 may be in a residential or commercial space, such as a smart home or smart environment. Each device may correspond to a different identifier.

The control instructions may be passed via a transceiver 134 from the wearable control unit 108 to the one or more output devices 104. The output devices 104 may receive the control instructions via a transceiver 146. The control instructions may be received in a unicast message transmitted directly to the one or more output devices using the unique identifier, or a broadcast message that includes the control instructions. The messages may include a device type for being controlled and/or the unique identifier of the activator 106. The output devices 104 may have a processor 144 for identifying whether they have the device type or unique identifier and, if so, executing the control instructions at the one or more output devices 104. The output devices 104 may receive the unique identifier of the activator 106 and/or a unique identifier of the wearable control unit in a message that is received and look up the control instructions locally in a memory 145. In another example, the control instructions may be received and executed at the output devices 104 in response to receipt from the wearable control unit 108.

The unique identifier may be used to determine which of the output devices 104 may be activated by a command from the wearable control unit 108. The output devices 104 may comprise dispensers of liquid. One of the liquid dispensers may be activated by the command. For example, each of the drink dispensers may receive the command via respective wireless transceivers. Each drink dispenser may determine whether the unique identifier received in the command corresponds to its own unique identifier. The drink dispenser that the unique identifier corresponds to may then activate, while other drink dispensers may remain in an inactive state. Each drink dispenser may include one or more LED(s) that may light up when the drink dispenser is activated. For example, the LED(s) may light in the same color as the LED(s) on the user control device (e.g., the activator and/or the control unit).

Alternatively, each of the drink dispensers may be associated with a different connection channel, and each drink dispenser may monitor its associated channel for a connection signal from the user control device. A memory 122 of the wearable control unit 108 may have one or more associations stored thereon, with each association including a correlation between an activator (e.g., a unique identifier of an activator) and a corresponding connection channel. When a given activator is attached to the wearable control unit 108, the wearable control unit 108 may determine the connection channel associated with the activator, and may attempt to connect to the dispenser associated with the connection channel. Once a connection is established, the wearable control unit 108 may send the command over the connection channel associated with the activator. The dispenser that is associated with the connection channel may activate upon receiving the command.

The wireless communication link 103 between the activator 106 and the wearable control unit 108 may comprise a different wireless communication protocol and/or channel than the wireless communication link 107 between the wearable control unit 108 and the output devices 104. For example, the wireless communication link 103 may comprise short-range wireless communications, such as a near-field communications or BLUETOOTH LOW ENERGY (BLE) communications, and the wireless communication link 107 may comprise another type of wireless communications, such as WIFI or cellular communications, for example.

The devices described herein may comprise one or more processors. The processors described herein may include one or more general purpose processors, special purpose processors, conventional processors, digital signal processors (DSPs), microprocessors, integrated circuits, a programmable logic device (PLD), application specific integrated circuits (ASICs), or the like. The processors may perform signal coding, data processing, power control, input/output processing, or any other functionality that enable the devices to operate as described herein. The processors may access memory for obtaining information to perform the functions described herein.

The devices described herein may comprise memory. The memory described herein may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The memory may be implemented as an external integrated circuit (IC) or as an internal circuit of the respective processors. As the processors may comprise an IC, the memory may or may not be illustrated or described in other embodiments specifically. However, similar embodiments may be implemented with external memory, as shown in FIG. 1.

The devices described herein may comprise one or more circuits for performing communication, such as a transceiver. The transceivers described herein may include be communication circuits capable of RF communication. The transceivers may be configured to communicate using different wireless protocols, channels, or networks. Though a single transceiver may be illustrated or described, multiple transceivers may be implemented, which may each perform communications according to different wireless protocols on different networks. Additionally, though a transceiver may be illustrated or described, other communication circuits may be implemented, such as a receiver, a transmitter, or other communications module capable of performing wired and/or wireless communications via a communication link.

Figure 2:
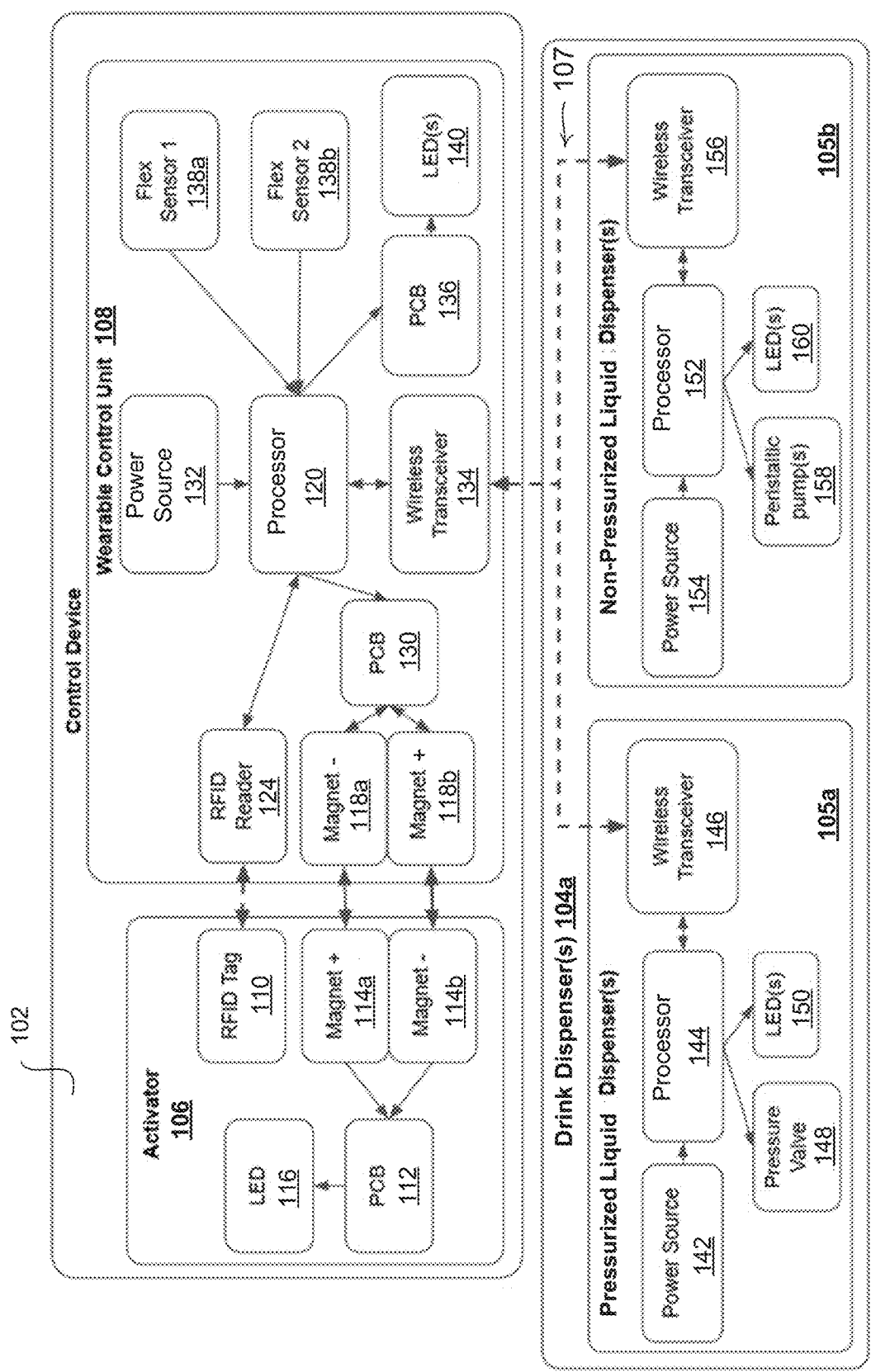

FIG. 2 is a block diagram illustrating the control system 100 shown in FIG. 1 with additional detail for an embodiment. As shown in FIG. 2, the wearable control unit 108 may be included in a wearable device, such as a wearable glove, that comprises one or more flex sensors (e.g., up to 5 flex sensors for glove), such as the flex sensors 138a, 138b. The flex sensors 138a, 138b may be connected via a wired connection to the processor 120. The flex sensors 138a, 138b may be used as triggers for controlling one or more output devices, such as a drink dispensers 104a. Though two flex sensors 138a, 138b are illustrated and described, other numbers of flex sensors may similarly be implemented.

In an example in which the flex sensors 138a, 138b are installed in a wearable glove, each flex sensor may be located on different finger portions (e.g., index finger and middle finger) of the glove. The flex sensors 138a, 138b may be installed on the inside or outside of respective finger portions on the glove and measure an amount of deflection or bending of each finger portion of the user in the glove. When a user closes a hand and bends the flex sensors 138a, 138b past a predefined threshold, the processor 120 may trigger a transmission of a command comprising the control instructions via the wireless transceiver 134. The predefined threshold may be set to a level that detects when a user has completely closed their fist, for example.

The processor 120 may be attached via a wired connection to receive values from the flex sensors 138a, 138b and use the combined values to determine whether the triggering event has been detected to transmit control instructions. The flex sensors 138a, 138b may be single axis flex sensors that flex or bend a certain radius and measure the resistance at the radius. The flex sensors 138a, 138b may be set at zero degrees and have a resistance value of zero when the user's hand is fully open. When the user makes a closed fist with the wearable glove, the flex sensors 138a, 138b may be flexed or bent to about ninety degrees from the full-opened position. The resistance value that is measured by the flex sensors 138a, 138b when the user makes the closed fist may be at or over 1,000 ohms for each flex sensor. The processor 120 may receive the resistance value from each of the flex sensors 138a, 138b for determining whether the predefined threshold has been met or exceeded. The processor 120 may add each value received from the flex sensors 138a, 138b and divide the total resistance value by the number of flex sensors 138a, 138b. The average resistance value calculated by the processor 120 may be compared to the predefined threshold. The use of an average value may allow for variation in how different users may make the same gesture or how the same user performs a gesture differently for control. In another embodiment, the total resistance value may be compared against the total resistance value of the added flex values. The predefined threshold value may be a value that indicates that the user is making a fist or another intentional gesture for performing control. For example, if the average resistance value is above 1,000 ohms, the processor 120 may determine that the user is making a fist and perform control. Multiple threshold values may be implemented. For example, a high-end threshold value and/or a low end threshold may be implemented to indicate the gesture to be performed by the user. For example, the user making a fist may be indicated by the average resistance value of the flex sensors 138a, 138b between 1,000 ohms and 2,000 ohms. Different gestures may correspond to control for different device types. Though a single axis flex sensor may be described, a dual axis flex sensor for may be implemented for identifying gestures performed by the user. The processor 120 may send control instructions for controlling the output device when the resistance value is above the predefined threshold and the RFID reader 124 is receiving or has received a unique identifier of the activator 106.

The resistance value of the flex sensors may be 138a, 138b used to perform different levels of control (e.g., speed, intensity, etc.) at the output devices. For example, after the resistance value exceeds a first threshold the processor 120 may determine different levels of resistance that have been met or exceeded. Each level may cause the processor 120 to send different control instructions, or control instructions configured to increase or decrease a speed or intensity level at the output devices (e.g., speed or intensity of a motor, a light, a dispenser). For example, each level of increased resistance may cause a dispensing unit to open a valve more to increase the speed of the pour and each level of decreased resistance may cause the dispensing unit to close the valve more to decrease the speed of the pour.

When a liquid dispenser is activated, it may cause a dispensing mechanism to dispense a liquid. For example, the dispensing mechanism may include one or more pressure valves and/or one or more peristaltic pumps. The dispensing mechanism may continue to dispense the liquid while the liquid dispenser is receiving the command. The liquid dispenser may dispense the liquid at a speed that is determined based on the flex value. For example, the liquid dispenser may dispense the liquid at a relatively slow speed if the flex value is relatively low and at a relatively fast speed if the flex value is relatively high. The liquid dispenser may stop dispensing the liquid when the liquid dispenser stops receiving the command (e.g., when the user stops making a fist), when the liquid dispenser receives a command to stop dispensing the liquid, and/or when a predetermined amount (e.g., a given number of ounces) of the liquid has been dispensed.

As illustrated in FIG. 2, the output device of the control system 100 may comprise one or more drink dispensers 104a. The processor 120 may send control instructions using the wireless communication link 107 that indicate a "pour" signal to a relevant drink dispenser 104a indicated in the unique identifier of the activator 106. The processor 120 may comprise a wired connection to the RFID reader 124 or another wireless transceiver, which receives data wirelessly in the form of the unique identifier from the RFID tag 110 in the activator 106. This unique identifier is used by the processor 120 to determine the drink dispenser 104a, or combination of drink dispensers, to be engaged and connected to through the transceiver 134 to be activated.

The user may select the proper activator 106 for controlling the drink dispenser 104a that they intend to control. The flex sensors 138a, 138b being activated past the predefined threshold may be used to confirm the intention of the user to pour a liquid from one or more drink dispensers 104a. The control instructions may be transmitted to cause the drink dispensers 104a to pour when both of the flex sensors 138a, 138b have been activated past the predefined threshold. The use of two or more flex sensors 138a, 138b may allow the user to put the wearable glove on, take the glove off, or move their hands more freely with the wearable glove on and prevent a false triggering event. The predefined threshold being set to a high-end value or low-end value may also prevent a false triggering event. For example, the value of the predefined threshold may be configured to cause the user to close their fist or perform another intentional action, which may prevent a false triggering event due to the user being less likely to perform the action while otherwise putting the glove on, taking the glove off, or wearing the glove. Though two flex sensors 138a, 138b are provided as an example, additional flex sensors 138a, 138b may be added to prevent a false triggering event. Additionally, or alternatively, though the flex sensors 138a, 138b may be described as having the same threshold for the triggering event, the flex sensors may be configured with different thresholds to cause the user to perform an intentional action that would be less likely to cause a false triggering event.

The processor 120 of the wearable control unit 108 may receive multiple inputs before triggering the control instructions. For example, the processor 120 of the wearable control unit 108 may wait to transmit the control instructions until after the wearable control unit 108 receives the unique identifier from the activator 106 above a signal strength threshold that enables the activator 106 to transmit its unique identifier successfully. After the processor 120 detects the unique identifier of the activator 106, the wearable control unit 108 may be engaged for enabling control in response to the flex sensors 138a, 138b. In another example, the processor 120 may first identify that the flex sensors 138a, 138b have flexed past the predefined threshold and then check to identify whether the activator has been engaged with the wearable control unit 108 (e.g., the wearable control unit 108 is currently receiving the unique identifier from the activator 106 or has received the unique identifier within a predefined period of time).

In one example, when the activator 106 is placed on the wearable control unit 108, the LED 116 on the activator 106 and the LED 140 on the wearable control unit 108 may be powered via the magnets 114a, 114b, 118a, 118b and the respective printed circuit boards (PCBs) 112, 130 to provide feedback to the user that the activator has engaged the wearable control unit 108 for performing control. The magnets 114a, 114b, 118a, 118b may be used to hold the activator in place on the wearable control unit 108 and also provide power to the LED 140 via a wired connection to a PCB 136. In an example, the activator 106 may be placed on the back side of the glove and held via the magnets until detached by the user. The activator 106 may have a diameter in the range of approximately 45 to 50 mm and a height in the range of approximately 22 to 28 mm. The glove or other wearable device may include a space having approximately the same dimensions for fitting the activator 106. The PCBs 112, 130 may include resistors for controlling the power provided by the magnets 114a, 114b, 118a, 118b, or NFC circuit capable of magnetic induction. The PCBs 112, 136 may include resistors for controlling the power provided to the LEDs 116, 140. The PCB 130 may clip into the wearable control unit 108 via the magnets 118a, 118b on the wearable control unit 108, which may be located in a PCB 130. That PCBs 130, 136 may be connected via wired connection to the processor 120, which may receive power from a power source 132. When the activator 106 is paired with the wearable control unit 108 via the magnetic connection, the LED 116 in the activator 106 receives power via the PCB 112 and illuminates. The PCB 112 may include the LED 116, a resistor for controlling power to the LED 116, and/or the magnets 114a, 114b through which the LED 116 is powered.

After the activator 106 has engaged the wearable control unit 108, the processor 120 may check in memory if the unique identifier received from the activator 106 is assigned to a specific drink dispenser 104a. If the unique identifier received from the activator 106 is assigned to a specific drink dispenser 104a, then the wearable control unit 108 will connect to the corresponding drink dispenser 104a. For example, the wearable control unit 108 may establish a dedicated connection to the drink dispenser 104a. After the flex sensors 138a, 138b detect an input from the user, the processor 120 may send a command comprising the control instructions to the drink dispensers 104a to pour the drink for as long as the input continues to be received from the user. For example, the processor 120 may send a command to cause the drink dispensers 104a to pour after the flex value of the flex sensors 138a, 138b meet or exceed the predefined value. When the flex value is less than the predetermined flex threshold, the processor 120 may send another command comprising control instructions configured to cause the drink dispensers 104 to stop pouring. In another example, the processor 120 may continue to send the command while the flex value is above the predefined value, and may stop sending the command when the flex value falls below the predefined threshold (e.g., the user stops making a fist).

Each device valve, or combination of valves, at the drink dispensers 104a may correspond to a different unique identifier received from an activator 106. The drink dispensers 104a may include multiple dispensers that each dispense liquid through different mechanisms. For example, the drink dispensers 104a may comprise one or more a pressurized liquid dispensers 105a and/or one or more non-pressurized liquid dispensers 105b. The pressurized liquid dispenser 105a may include a power source 142, a wireless transceiver 146, a processor 144, and a pressure valve 148. After the activator 106 is placed on the wearable control unit 108, the wearable control unit 108 of the control device 102 may receive the unique identifier and connect to the wireless transceiver 146 by transmitting a message via the wireless communication link 107 to activate the drink dispensers 104a. The processor 144 may activate the pressurized liquid dispenser 105a in response to the message. The pressurized liquid dispenser 105a may include one or more LEDs 150 that may be illuminated upon the connection or activation to provide feedback to the user that the pressurized liquid dispenser 105a has been activated. The processor 144 may be powered by the power source 142 and receive a command via the wireless transceiver 146 to activate the pressure valve 148 and provide power to the LEDs 150. Activating the pressure valve 148 may allow the pressurized liquid to flow through the valve. Each output device 104 may receive a first message from the control device 102 to connect or activate in response to the unique identifier being received from the activator 106 and then perform control in response to subsequent control instructions in another message, or a single message may be used to connect to/activate the output device and perform control. The LEDs 150 may turn on, increase in intensity, and/or change in color. The color of the LEDs 150 may change to correspond to the color of the LED 116 of the activator 106 on the control device 102 for which the pressurized liquid dispenser 105a has been activated. The processor 144 may look up the color to display the LEDs 150 in response to the message received that may include the unique identifier of the activator 106. Each output device 104 may have a different activator 106 with a corresponding color and/or intensity for being displayed via the LEDs 116 of the activator and the LEDs of the output devices. As such, in a system having multiple output devices 104, the user may identify the corresponding output device 104 that has been activated by the activator being attached to the wearable control unit 108. After being activated, the processor 144 may then listen for the command comprising the control instructions to start or stop dispensing, and control the pressure valve 148 accordingly.

The pressure valve 148 may be a normally closed solenoid valve. The normally closed solenoid valve may be an electromechanical device that controls the flow of the pressurized liquid through the system. The normally closed solenoid valve may include a plunger that remains in a closed position until the command to open the valve is received. The normally closed solenoid valve may include a coil that, when activated, will cause the plunger to open and allow the pressurized liquid to pass through the valve.

The non-pressurized liquid dispenser 105b may include a power source 154, a wireless transceiver 156, a processor 152, and one or more peristaltic pumps 158. After the control device 102 connects to the wireless transceiver 156 by transmitting a message via the wireless communication link 107, the processor 152 may activate the peristaltic pump 158. The peristaltic pumps 158 may include one or more LEDs 160 that may be illuminated upon activation to provide feedback to the user that the peristaltic pump 158 has been activated. The processor 152 may be powered by the power source 154 and receive a command via the wireless transceiver 156 to connect to and/or activate the peristaltic pumps 158 and provide power to the LEDs 160. Activating the peristaltic pump 158 may allow the non-pressurized liquid to flow through the pipes that pass through the peristaltic pump 158. The LEDs 160 may turn on or change a color. The color of the LEDs 160 may change to correspond to the color of the LED 116 of the activator 106 on the control device 102 for which the peristaltic pump 158 has been activated. The processor 152 may look up the color to display the LEDs 160 in response to the message received that may include the unique identifier of the activator 106. After being activated, the processor 152 may then listen for the command comprising the control instructions to start or stop dispensing, and control the peristaltic pump 158 accordingly.

Figure 3A:
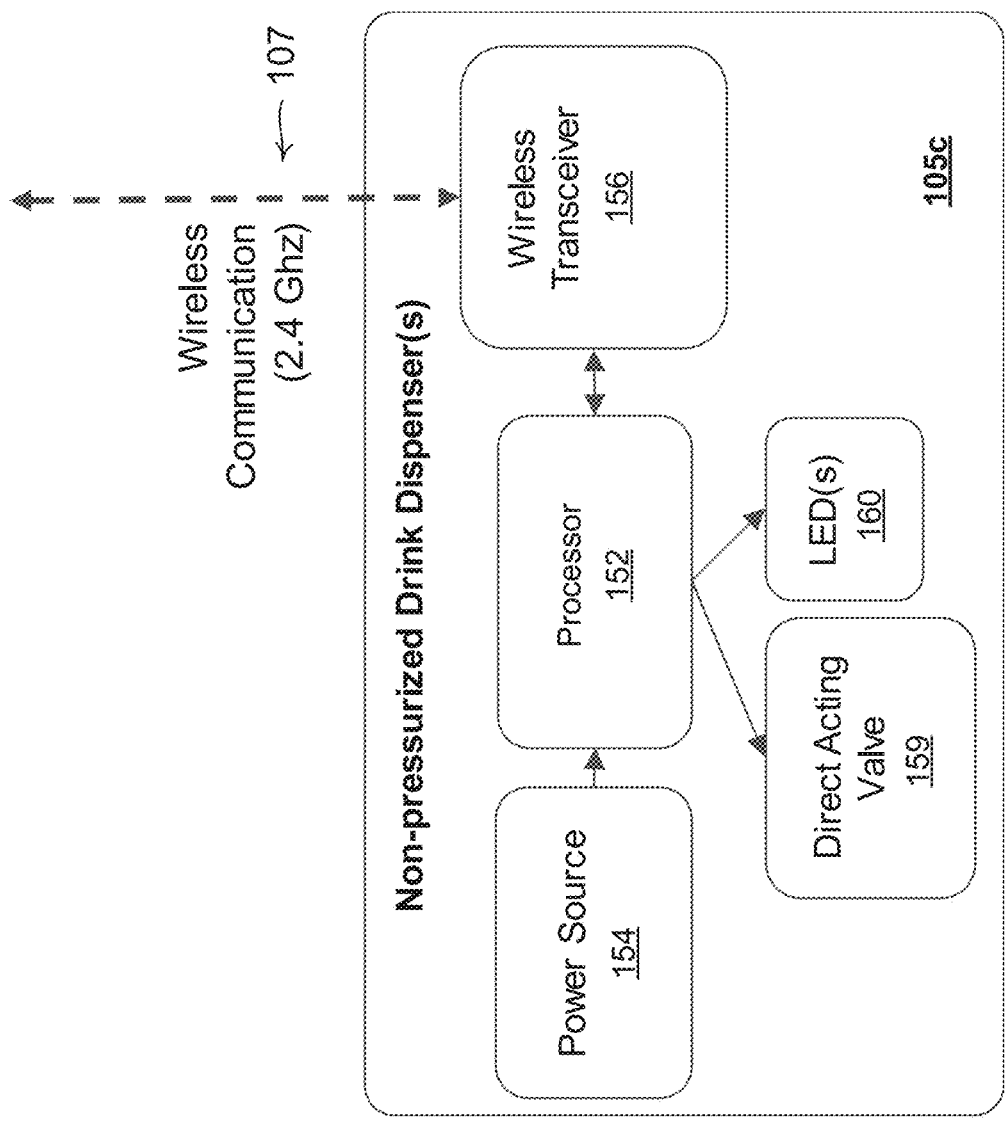
FIG. 3A is a block diagram of a type of non-pressurized drink dispenser that may be controlled as an output device.

FIG. 3A is a block diagram of another type of non-pressurized drink dispenser 105c that may be controlled as an output device as described herein. For example, the non-pressurized drink dispenser 105c may be similar to the non-pressurized drink dispenser 105b, but may use gravity to dispense liquid using a direct acting valve 159, instead of using a peristaltic pump to pour the liquid. One or more valves of the non-pressurized drink dispenser 105c may correspond to a unique identifier of an activator for being identified for control by the control device 102.

As shown in FIG. 3A, the non-pressurized drink dispenser 105c may include one or more direct acting valves 159 that use gravity for drink dispensing of the non-pressurized liquids. The processor 152 may receive a command via the wireless transceiver 156 to activate the direct acting valve 159 and provide power to the LEDs 160. Activating the direct acting valve 159 allows the non-pressurized liquid to flow through the valve.

The direct acting valve 159 may be a normally closed direct acting solenoid valve. In a normally closed direct acting solenoid valve, a current may be applied through a coil to generate a force to open a plunger in response to the control instructions in the messages received. The force may pulls the plunger open and allow the liquid to flow through the valve.

FIG. 3B is a block diagram illustrating an example system 300 that includes a direct acting valve 159 that may be used to dispense a liquid using gravity. Referring to FIG. 3B, the liquid may be held within a basin 322 (e.g., a vat). The basin 322 may be connected via a connector 324 to a coupler 326. The connector 324 may be configured such that it is able to connect the basin 232 to the coupler 326. The coupler 326 may be, for example, a ⅜" John Guest keg coupler. The coupler 326 and the connector 324 may attach the basin 322 to the direct acting valve 159. For example, the direct acting valve 159 may be opened in response to activation and/or control instructions and use gravity to allow liquid to pass through freely. The direct acting valve 159 may be closed in response to activation and/or control instructions to prevent the liquid from passing through the valve. The basin 322 may be at a higher elevation than the direct acting valve 159, such that when the direct acting valve 159 is opened, the liquid is dispensed via gravity.

Figure 4:
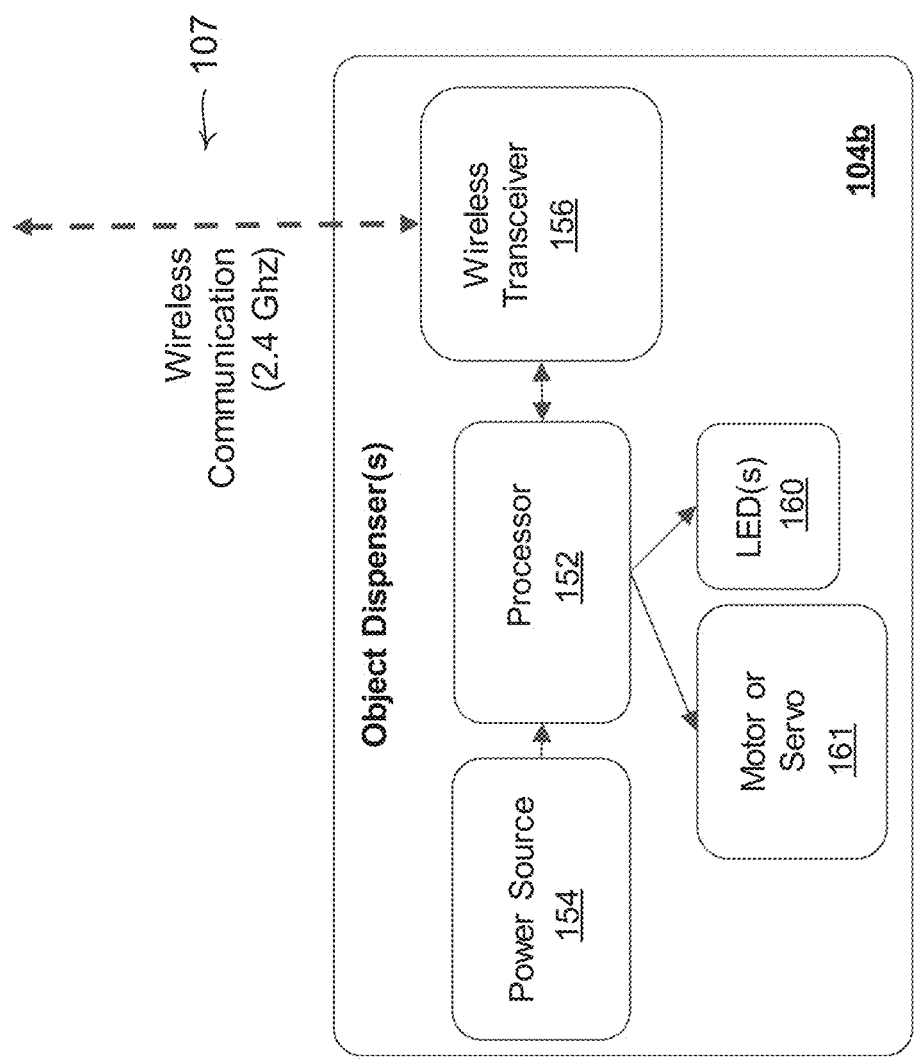
FIG. 4 is a block diagram illustrating an example of another type of output device that may be controlled.

FIG. 4 is a block diagram illustrating an example of another type of output device 104b that may be controlled as described herein. The output device 104b may be an object dispensing system that dispenses solid objects, rather than liquid. For example, the output device 104b may dispense food items, toys, ice cream, or other solid objects. The output device 104b may include an electric motor or servo 161 for controlling the output of the solid objects at the output device 104b. The electric motor or servo 161 may turn an auger to dispense the objects, for example. The servo may include a motor that may use feedback or error-correction signals to control the position and/or speed of the motor to ensure the proper amount of the objects are being dispensed at the proper speed. The output device 104b may include the processor 152, which is powered by the power source 154 and receives a command via the wireless transceiver 156 to activate the motor or servo 161 and provide power to the LEDs 160. The processor 152 may control the motor or servo 161 to ensure the proper amount of the objects are being dispensed at the proper speed in response to the control signals that are received via the wireless transceiver 156. The processor 152 may operate the motor or servo 161 for a period of time or to dispense a number or amount of objects in response to the control signals.

Figure 5A:
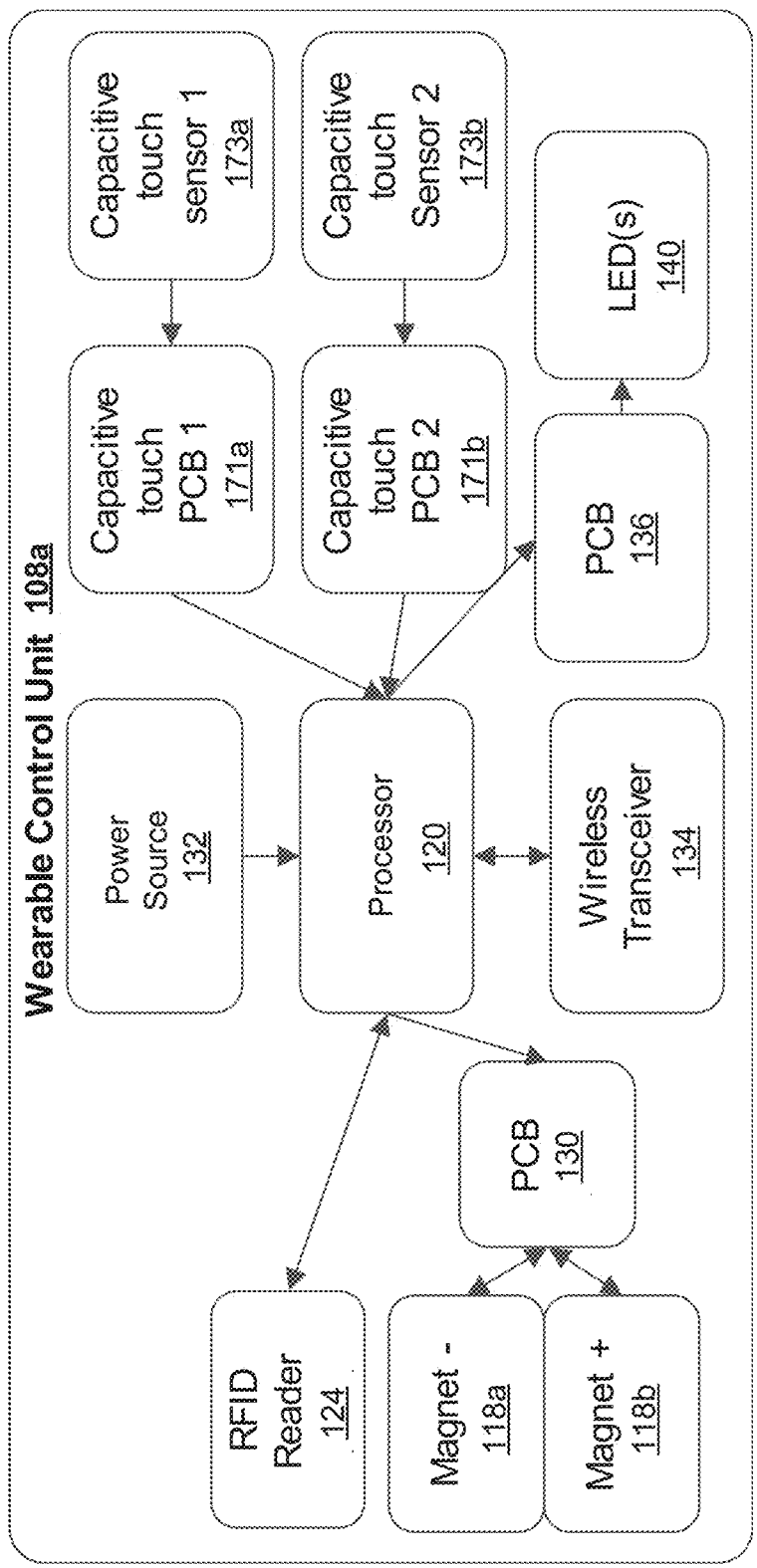
FIG. 5A is a block diagram illustrating an example of another configuration for a wearable control unit that may be implemented to control output devices.

FIG. 5A is a block diagram illustrating an example of another configuration for a wearable control unit 108b that may be implemented to control output devices as described herein. The wearable control unit 108a of FIG. 5A is similar to the wearable control unit 108 shown in FIG. 2. The wearable control unit 108a of FIG. 5A includes capacitive touch sensors 173a, 173b that may transmit a signal in response to a user's touch that is received by the processor 120 as input for performing control of the output devices. Capacitive touch technology may use a conductive touch (e.g., of a human finger and/or a specialized device) for input. Capacitive touch technology may be used to control the output devices with one or more fingers. When the capacitive touch sensors 173a, 173b are touched by the user, a relatively small amount of charge may be drawn to the point of contact, which may become a functional capacitor.

The capacitive touch sensors 173a, 173b may include a capacitive touch coil configured to generate, in conjunction with a respective capacitive touch PCB 171a, 171b, a touch-responsive area. FIG. 5B is a block diagram illustrating an example configuration of the capacitive touch sensor 173a mounted to the capacitive touch PCB 171a. Other capacitive touch sensors and capacitive touch PCBs, such as the capacitive touch sensor 173b and the capacitive touch PCB 171b, may have a similar configuration. As shown in FIG. 5B, the capacitive touch sensor 173a may be mounted to the capacitive touch PCB 171a. For example, the capacitive touch sensor 173a may be soldered onto the capacitive touch PCB 171a. A touch pad 183 may provide an input area on a user interface to the user and the capacitive touch coil of the capacitive touch sensor 173a may generate the input signal in response to the user touching the touch pad 183. The input signal may be generated in response to one or more capacitive touch sensors being activated by a user.

The capacitive touch sensor 173a may be associated with a first resistance value, a second resistance value, and/or a capacitance value. The capacitive touch sensor 173a may function using a chip (e.g., an AT42QT1011-TSHR chip). The capacitive touch sensor 173a may have one or more inputs and may include a power source and/or a copper coil. The copper coil may be used to receive the input from the touch pad 183. The capacitive touch sensor 173a, which may be connected to the processor 120, may provide an input to the processor when the resistance value is met or exceeded at the capacitive touch sensor 173a to identify a triggering event.

A resistor 181 may be mounted on the capacitive touch PCB 171a. A larger or more powerful resistor 181 may allow the capacitive touch sensor 173a to detect the presence of the user more easily and a smaller or less powerful resistor 181 may cause the user to be closer to the touch pad or press harder on the touch pad for the capacitive touch sensor 173a to detect the presence of the user's touch. In an example, a 1 megohm resistor or less may be used for the capacitive touch sensor 173a to detect an absolute touch to activate. With the implementation of a 10 megohm resistor, the capacitive touch sensor 173a may begin to respond when the user is inches away from the touch pad 183. The capacitive touch sensor 173a may provide the input when the resistance value that is received from the resistor 181 at the capacitive touch sensor 173a meets or exceeds the defined resistance value. After the capacitive touch sensor 173a detects the user's presence on the touch pad 183, or the user's presence above a threshold, the capacitive touch sensor may send the input signal, via the capacitive touch PCB 171a, to the processor 120. A data signal may be transmitted through a wired connection to the processor 120 and power may be provided through a wired connection.

Referring again to FIG. 5A, the input may be received from the capacitive touch sensors 173a, 173b while the user is touching the sensors. As such, the output devices may be controlled while the user is touching the capacitive touch sensors 173a, 173b. The input received from the capacitive touch sensors 173a, 173b may be one of multiple inputs that are used by the processor 120 to trigger the transmission of control instructions to one or more output devices. For example, the processor 120 may use the input from the capacitive touch sensors 173a, 173b in combination with the unique identifier received from an activator 106 to enable control of the output device that corresponds to the unique identifier received from the activator 106, similarly as described herein with regard to one or more flex sensors. In an example, while the processor 120 is receiving the unique identifier of the activator 106 and receiving the input from the capacitive touch sensors 173a, 173b, an output device may be activated, turned on, a valve may be turned on to dispense a liquid or a solid, and/or another output may be provided.

The capacitive touch sensors 173a, 173b may be located on a wearable device, such as a hat, head gear, glove, or other wearable device. The capacitive touch sensors 173a, 173b may be located in a position on the wearable device that indicates an intent of the user to transmit the control instructions. As shown in FIG. 5A, multiple capacitive touch sensors 173a, 173b may be implemented to prevent false triggering events in response to receiving a user touch. In an example, multiple capacitive touch sensors (e.g., 2-4) may be located on the palm of a glove and positioned to receive a touch from individual fingers of a user when the user is making a gesture of a fist, or at least depressing two or more fingers in the user's palm. In another example, the capacitive touch sensors 173a, 173b may each be located on opposite sides of a hat or headgear that may be worn by the user. The activator 106 may be placed on a portion of the hat or headgear (e.g., front surface, top surface, rear surface, or a left or right surface of a helmet, tiara or other headgear) and held in place via the magnets until removed by the user. Though multiple capacitive touch sensors 173a, 173b are provided, a single capacitive touch sensor may similarly be implemented. However, when multiple capacitive touch sensors 173a, 173b are implemented, each capacitive touch sensors 173a, 173b may operate as a separate form of input that may be received by the processor 120 to trigger the transmission of the control instructions for controlling the one or more output devices. For example, the processor may receive the unique identifier from the activator 106 and receive the input from both the capacitive touch sensor 173a and the capacitive touch sensor 173b before transmitting the control instructions for controlling the output devices.

Figure 6:
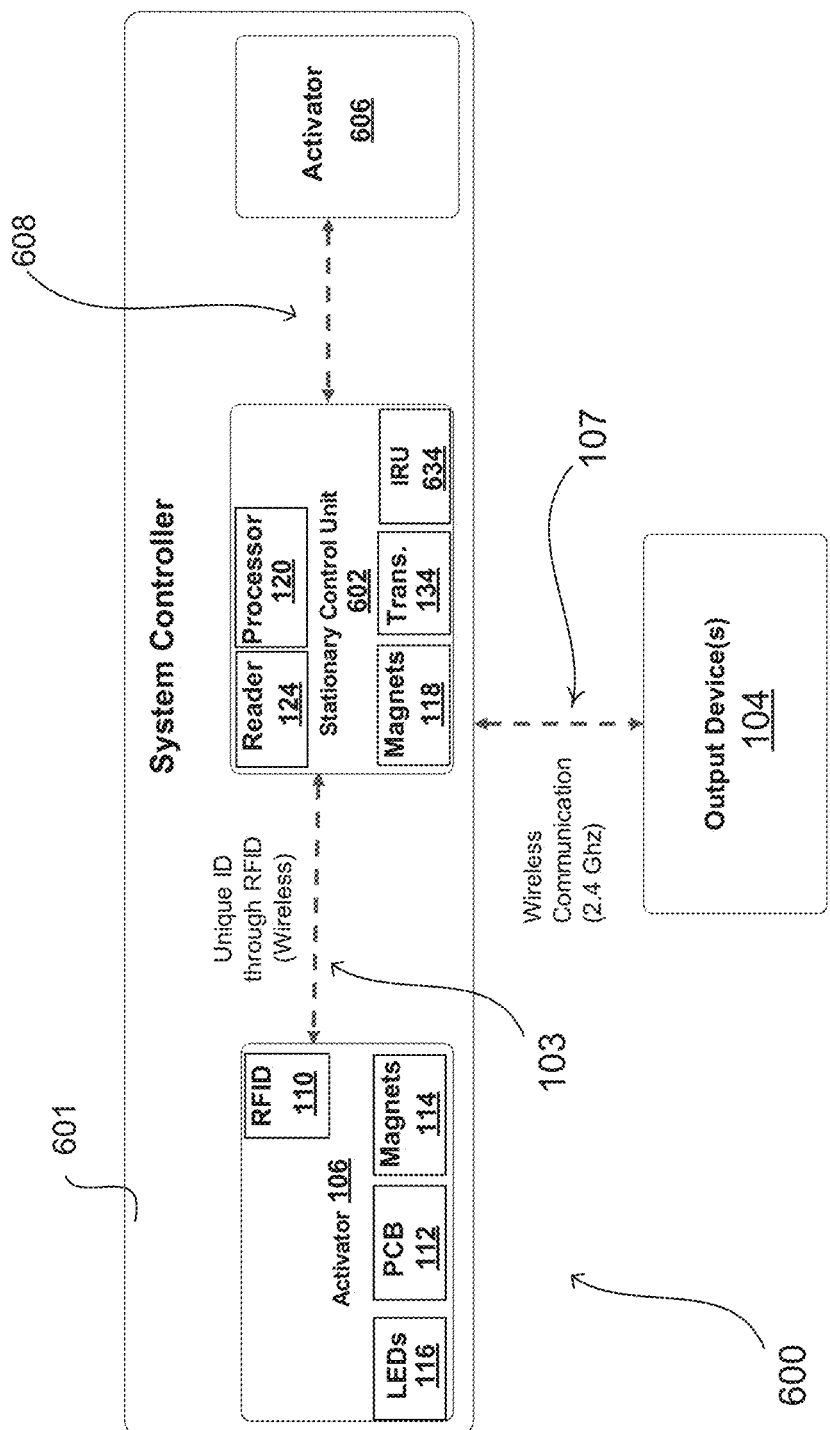
FIG. 6 is a block diagram illustrating another example control system for controlling one or more output devices.

FIG. 6 is a block diagram illustrating another example control system 600 for controlling one or more output devices 104. The control system 600 may be similar to the control system 100 shown in FIG. 1. The control system 600 may comprise a system controller 601 that operates differently than the control device 102 comprising the wearable control unit 108. For example, the system controller 601 may comprise a stationary control unit 602. The stationary control unit 602 may be a stationary computing device, rather than a wearable control device, which may be mobile. The stationary control unit may comprise the RFID reader 124 or other wireless transceiver for receiving the unique identifier of the activator 106 via the wireless communication link 103. The activator 106 may be placed on the stationary control unit 602 and be maintained in place via the magnets 114, 118, which may generate the power for powering the LEDs 116, as described herein. Though described as a stationary control unit 602, the control unit 602 may be a portable control unit with similar functionality and powered by a portable power source (e.g., a battery).

The processor 120 of the stationary control unit 602 may receive the unique identifier of the activator 106 as a first input for communicating control instructions via the transceiver 134 to the one or more output devices 104 that correspond to the unique identifier in memory (e.g., internal or external to the processor 120). The processor 120 of the stationary control unit 602 may receive a second input from the activator 606 via the input receiving unit (IRU) 634 to enable the stationary control unit 602 to transmit an activation signal and/or control instructions to the one or more output devices 104 for performing control, as described herein. For example, the output devices 104 may comprise a valve for pouring liquid, an electrical motor for dispensing solids or performing other control, a lighting load, a door lock, a magnetic stirring mechanism, a water vaporizer, a fog machine, a pump, a linear actuator, an auger, a servo, a speaker, or another output device capable of being controlled.

The activator 606 may include a control device that may implement RF communications via the wireless link 608 for providing the input that is the triggering event that enables control of the one or more output devices 104 (e.g., dispensing, etc.). For example, the control device of the activator 606 may transmit an RFID to the input receiving unit 634, which may be another RFID reader or other transceiver or receiver for receiving an RFID. The RFID may be any RFID to activate or control the one or more control devices 104. In another example, the RFID may be associated with one or more predefined users for enabling activation and/or control of the output device 104 indicated by the unique identifier received from the activator 106. The processor 120 may continue to perform control (e.g., dispensing, etc.) while the RFID is being received and may transmit a command to stop performing control (e.g., dispensing, etc.) when the RFID is not being received or is not being received above a defined signal strength.

The activator 606 may include a magnet or coil configured to provide a magnetic signal or magnetic induction (e.g., via NFC signals) as input to the processor 120 that is received as a triggering event for performing control of the one or more devices. The input receiving unit 634 may comprise a magnetic sensor capable of detecting a magnetic current above a predefined threshold. For example, the input receiving unit 634 may include a Hall effect sensor that may detect when the magnet in the activator 606 is within a pre-defined range of the sensor, and may indicate that the magnet is detected to the processor 120. The Hall effect sensor may determine whether a magnet is within a pre-defined range of the stationary control unit 602 by measuring the magnitude of the magnetic field of the area surrounding the Hall effect sensor. For example, the Hall effect sensor may generate a voltage having a magnitude that is directly proportional to the strength of the magnetic field through the Hall effect sensor. The Hall effect sensor may determine that the magnet is within the pre-defined range of the stationary control unit 602 when the voltage exceeds a threshold value.

The stationary control unit 602 may be external to the output devices 104 and communicate with the output devices via wireless communication link 107. In another example, the stationary control unit 602 may include the output devices 104. For example, the stationary control unit for receiving the activator 106 and the input from the activator 606 may include one or more dispensers or other output devices 104. The communication link 107 may be a wired communication link to allow for communication between the stationary control unit 602 and the output devices 104, such as when the output devices 104 are included in the stationary control unit 602.

Figure 7:
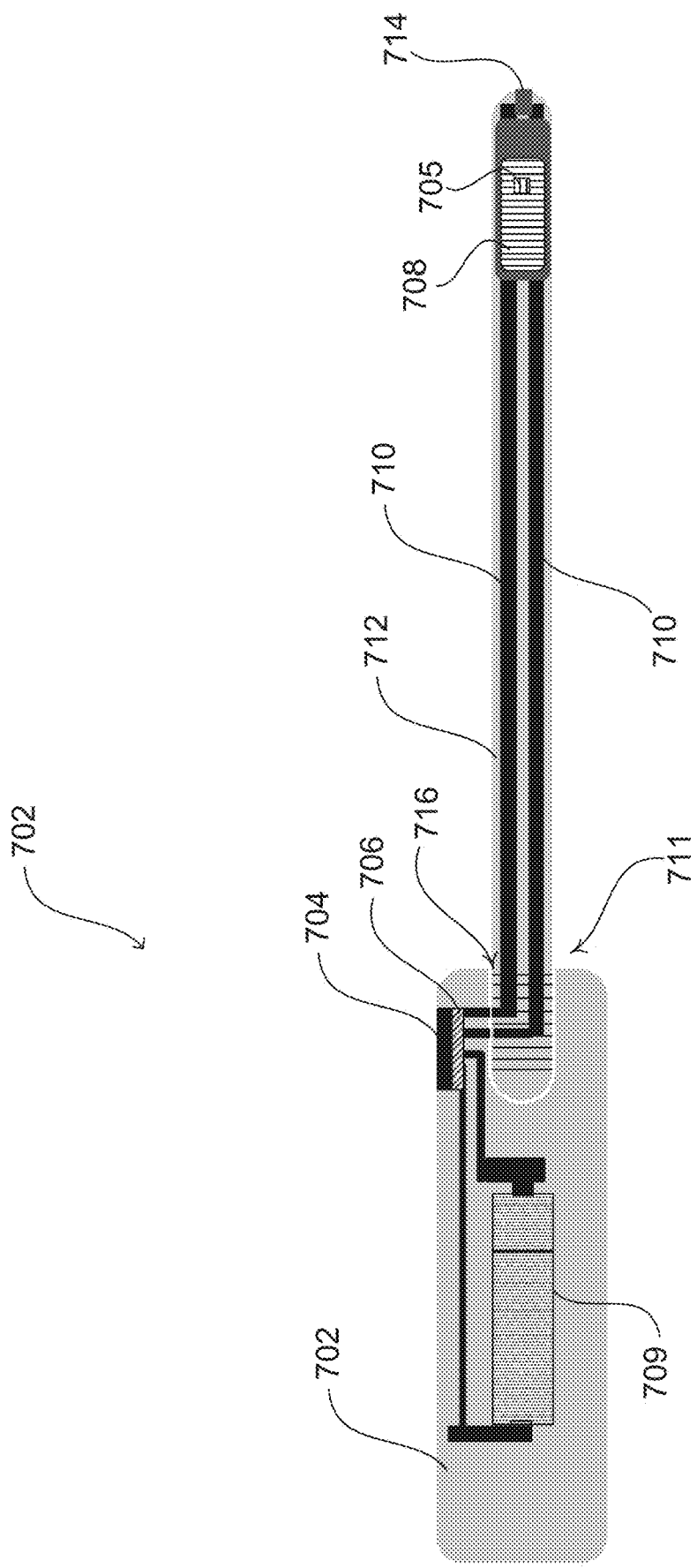
FIG. 7 is an example of a control device that may be implemented for performing control.

FIG. 7 is an example of a control device 700 that may be implemented for performing control using the RFID or magnet, though other types of control devices may be similarly implemented. The control device 700 may be in the shape of a wand, for example. The control device 700 may have a handle 702 and a shaft 712. The control device 700 may include an RFID tag 708 or another circuit capable of RF communications. The RFID tag 708 or other RF communication circuit may operate using RF communications. For example, the RF communication circuit may communicate an RFID, Bluetooth (e.g., Bluetooth low energy (BLE)), and/or Near Field Communication (NFC) signals for enabling control of devices in a user environment. The control device 700 may interact with (e.g., communicate) with the stationary control unit 602 shown in FIG. 6. For example, the RFID tag 708 may transmit a unique identifier associated with RFID tag 708 to the stationary control unit (e.g., via an antenna) when the RFID tag 708 comes within a predefined RF range of the antenna.

The RFID tag 708 or other RF communication circuit may include an LED 705. The LED 705 may turn on/off/blink to provide indications to the user. For example, the LED 705 may blink when the control device 700 is turned on or off, the control device 700 communicates with another device (e.g., the stationary control unit), and/or another action is performed by the control device 700.

The handle 702 may include an input area 704. The input area 704 may be a button that may be actuated by a user. The input area 704 may be may be a capacitive touch area that senses user input upon a user touch. The user may touch the input area 704 to interact with a processor 706 in the control device 700. The processor 706 may be in direct communication with the input area (e.g., a capacitive touch control circuit) to receive input from the user. The processor 706 may send one or more signals via filaments and/or wires 710 to a resistor/LED 714. The resistor/LED 714 may be located at the distal end of the shaft 712. The resistor/LED 714 may be different from the LED 705. When the user touches the input area 704, the resistor/LED 714 may be illuminated. For example, the resistor/LED 714 may turn on, increase in lighting level over a period of time to a maximum lighting level, or blink. When the user touches the input area 704 again, or releases the touch from the input area, the resistor/LED 714 may be turned off, decrease in lighting level over a period of time to a minimum lighting level (e.g., off), or stop blinking. The filaments and/or wires 710 may be made of any suitable material. For example, filaments and/or wires 710 may be made of a graphite-PLA composite (e.g., if they are filaments), or copper (e.g., if they are wires).

The resistor/LED 714 and/or the control circuit 706 may be powered by a power source 709. For example, the power source 709 may be a battery. The power source 709 may be replaceable via an opening 711 in the handle 702 where the handle 702 and shaft 712 are connected to each other. The power source 709 may power other elements of the control device 700 via the filaments and/or wires 710. The power source 709 may be connected to a charging coil (not shown) that may be contained within the handle 702. The handle 702 and the shaft 712 may be detachable from each other. For example, the handle 702 and the shaft 712 may be attached to each other by threads 716.

The control device 700 may include a magnet or NFC circuit (not shown). For example, the magnet or NFC circuit may be located in the tip of the control device. The magnet or NFC circuit may be placed in addition to or alternatively to the RFID tag 708. For example, as described above, the control device 700 may interact with a stationary control unit. The stationary control unit may include a sensor (e.g., a Hall effect sensor). The sensor may detect when the magnet enters within a pre-defined range of the sensor, and may indicate that the magnet is detected.

Figure 8:
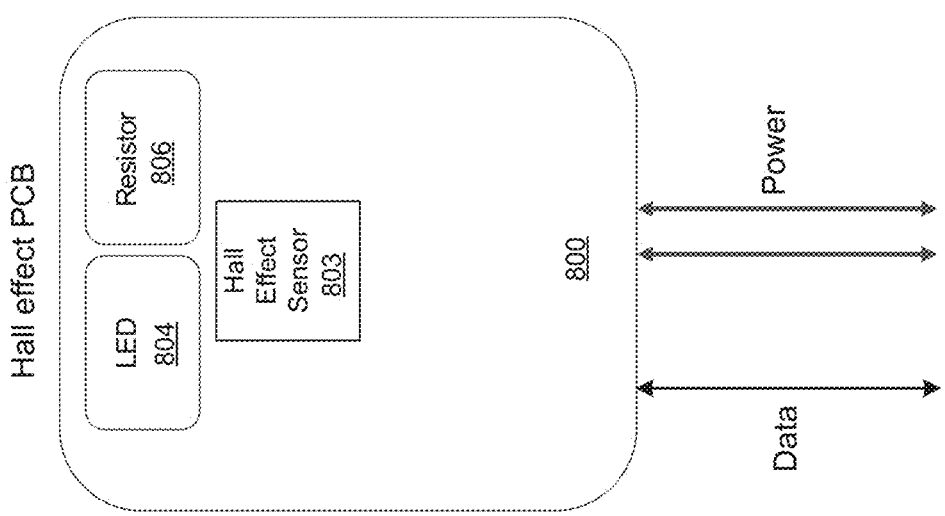
FIG. 8 is a block diagram illustrating an example of a Hall effect PCB to which a Hall effect sensor may be mounted.

FIG. 8 is a block diagram illustrating an example of a Hall effect PCB 800 to which a Hall effect sensor 803 is mounted. The Hall effect PCB 800 may be in communication with the processor 120 of the stationary control unit 602. The Hall effect PCB 800 may have the Hall effect sensor 803 mounted thereto for measuring whether a magnetic current generated by the magnetic field is above a predefined threshold. For example, the Hall effect sensor 803 may detect when the magnet in the activator is within a pre-defined range of the sensor. The Hall effect sensor 803 may generate a voltage having a magnitude that is directly proportional to the strength of the magnetic field through the Hall effect sensor 803. The power received through the magnets or magnetic coils may be used to provide power to an LED 804 to indicate that the magnetic current is above the threshold of the Hall effect sensor 803. The resistor 806 may include one or more resistors 806 for controlling the power provided to the LED 804.

Figure 9A:
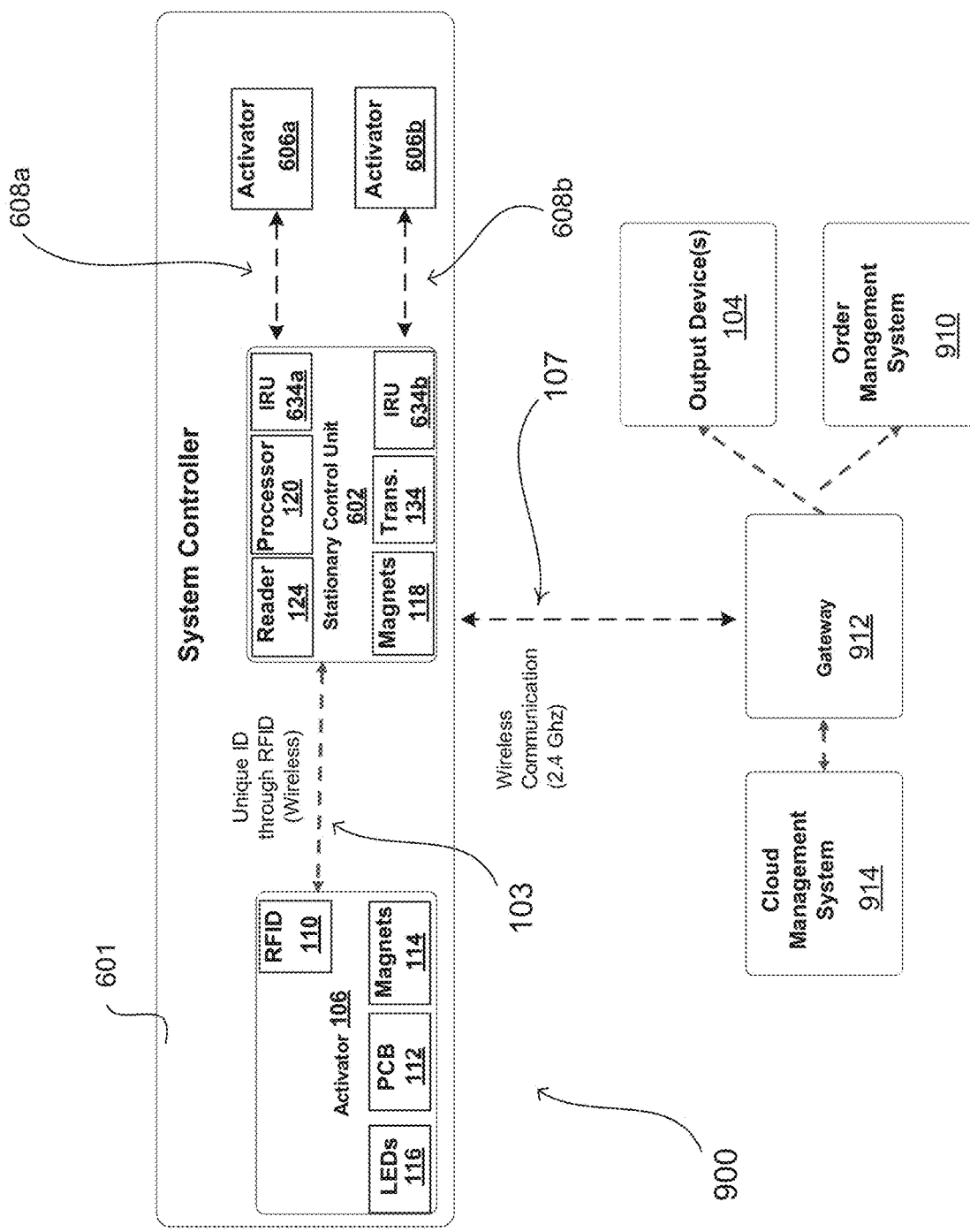
FIG. 9A is a block diagram illustrating another example control system for controlling one or more output devices and/or tracking one or more orders at an order management system.

FIG. 9A is a block diagram illustrating another example control system 900 for controlling one or more output devices 104 and/or tracking one or more orders at an order management system 910. The control system 900 may include a system controller 601. The system controller 601 may include the activator 106 that provides the unique identifier for identifying the output device 104 to be controlled. The stationary control unit 602 of the system controller 601 may comprise multiple input receiving units (IRUs) 634a, 634b. The input receiving unit 634a may be an RFID reader that may receive an RFID or other unique identifier associated with a user from an RFID tag or other transmitter included in the activator 606a. The RFID or other unique identifier may be transmitted via wireless communication link 608a. The RFID or other unique identifier that is associated with the user may be received by the processor 120 and may be used by the processor 120 to check if the user associated with the unique identifier has permission to perform control of the output device 104 that is indicated by the unique identifier of the other activator 106. For example, the processor 120 may determine whether the unique identifier associated with the user has access to dispense liquids via one or more dispensers.

After the processor 120 receives the unique identifier associated with the user, the processor 120 may transmit the unique identifier via the wireless communication link 107 and the gateway 912 to a cloud management system 914. The gateway 912 may be a computing device that comprises a processor and one or more transceivers capable of communicating with and/or relaying communications between the devices described herein. The cloud management system 914 may manage user permissions by associating the unique identifiers associated with users (e.g., the RFIDs received via the input receiving unit 634a) with device identifiers or device types for the output devices 104 that may be accessed by the user. The unique identifiers associated with users may also give different levels of access permissions per output device 104. For example, a user with a higher level of access permissions may be given additional features to control for an output device (e.g., higher speed or quantity limits for dispensers).

If the unique identifier that is received via the input receive unit 634a indicates that the user fails to have access to the output device 104, the stationary control unit 602 may prevent control of the output device 104 unless a different activator 106 is received by the processor 120 for which the user has access permissions or the user's access permissions are changed to enable access. If the unique identifier that is received via the input receive unit 634a indicates that the user has access to the output device 104, the stationary control unit 602 may allow for control of the output device 104 in response to the detection of the activator 606b via the input receive unit 634b. For example, the user may place the activator 606a in a slot in the stationary control unit and may have access to perform control of the output device 104 indicated by the unique identifier of the activator 106 so long as the activator 606a is detected by the processor 120 of the stationary control unit 602. While the activator 606a is placed on or within range of the stationary control unit, the user may place the activator 606b within range of the input receive unit 634b of the stationary control unit 602 to activate the corresponding output device 104. For example, the user may place a device having another RFID tag within range of an RFID reader of the input receive unit 634b to begin dispensing liquid at a dispenser. As described herein, the RFID reader of the input receive unit 634b may accept any RFID for activating the output device 104. In another example, the activator 606b may include a magnet and the input receive unit 634b may include a Hall effect sensor and/or a Hall effect sensor PCB for detecting a threshold level of current generated by a magnetic field for enabling control of the output device 104.

The cloud management system 914 may include a processor that is configured to log the amount of an item that has been dispensed or used by the user, or time over which the item was dispensed or used by the user, in memory while the output device 104 has been activated. For example, the processor 120 may determine the amount of time the activator 606b has been used to activate the output device and send the amount of time to the cloud management system 914. The cloud management system 914 may determine from the amount of time received and the output device being controlled to log the amount of the item dispensed or used in memory with the unique identifier of the user. In another example, the output devices 104 themselves may track, via a local processor and/or sensor device, the amount of an item that has been dispensed or used and send the information to the cloud management system 914 for being logged in memory with the unique identifier of the user. Thus, the cloud management system 914 may maintain a record of the liquid or items dispensed or used by each user of the system 900.

The cloud management system 914 may maintain a database. The database may store one or more associations between a unique identifier of the user and a type of control that has been performed of an output device 104. For example, the output device 104 may be an electronic lock on a door. The database may store an association between the unique identifier and locking the door (e.g., if the door is unlocked) or unlocking the door (e.g., if the door is locked). The database may store an association of the unique identifier with an identifier of a valve or dispenser that has been accessed by the user. The database may also store an amount of time the output device 104 has been accessed, turned on, or used.

The database may include access permissions for the unique identifier. The cloud management system may determine an access permission associated with the identified output device 104 for a user based on, for example, an identity of the output device 104, a quality and/or state of the output device 104, a time value, and/or another parameter. For example, the unique identifier may have access permission that is associated with a valve that controls the flow of a liquid. When the processor of the cloud management system 914 receives the unique identifier of the activator 106 and determines from the database that the unique identifier of the user has access to the valve indicated by the unique identifier of the activator, the access permission may be indicated to the processor 120 of the stationary control unit 602. The controllable device 810 may also be used to activate a magnetic stirring mechanism, a motor, a lock, a water vaporizer, a fog machine, a pump, a linear actuator, an auger, a servo, a speaker, or a microcontroller.

The unique identifiers in the database may be associated with the name of the user. The database may include a Boolean variable for each unique identifier indicating whether the unique identifier is active or a control device associated with the unique identifier is active for performing control. The Boolean variable may be used to determine whether the user has access to perform control. The unique identifier of a user may be marked as active when a control device is assigned to a user, and marked as inactive when the user returns the control device.

The cloud management system 914 may include a computing device that may be used to monitor and/or control the reception of the unique identifier, the accessing of the database, and/or the access permissions to output devices 104. The computing device may log a number of times that an output device 104 is accessed, an amount of time the output device 104 is controlled or used, and/or a number of distinct unique identifiers that have accessed the output device 104.

In one example, the computing device of the cloud management system 914 may measure an amount of time that a valve was open for dispensing liquid, which may be directly proportional to the amount of liquid dispensed. In another example, the output device 104 itself may directly measure the amount of liquid poured and communicate that amount to the computing device of the cloud management system 914. In another example, the output device 104 may include a peristaltic pump or pumps that measures the time and/or rotations of the pump to determine the volume of liquid that has been dispensed.

The computing device of the cloud management system 914 may determine an amount of money owed by the user based on the amount of liquid dispensed. The computing device may communicate information to the database. As different liquids may have a different cost and/or pressure associated therewith, the computing device may associate the cost and/or pressure for each liquid dispensed from an output device 104. The computing device may obtain information from the database and may display the information to a user or otherwise use the information. For example, the information may be displayed on a screen or may be spoken to the user via an audio speaker. The information may be displayed on the screen in response to a request from the user. The request may be in the form of the receipt of the unique identifier associated with the user, which may be received by the system via an RFID reader when the RFID of the user device is read.

In addition to, or as an alternative to, performing control of the one or more output devices 104, access may be granted for allowing the user to order one or more quantities of an item indicated by the activator. For example, the stationary control unit 602 may include a different number of input receive units 634b that are each assigned a different identifier that indicates a quantity of the item being ordered. The activator 606b coming within range of the input receive unit 634b may cause the processor 120 to identify the associated quantity for the order and send the quantity to a processor of an order management system 910 for tracking the number of items that have been ordered in memory. The order management system 910 may display to a second user the number of orders to be provided to the first user that placed the order. In another example, the number of orders may be used by the processor of the order management system 910 or the processor 120 to communicate with the output devices how long to perform control. For example, the number of orders may multiply the amount of liquid that is to be dispensed. The order management system 910 may communicate the number of orders associated with the unique identifier of the user to the cloud management system 914 for being stored with the user's identifier.

In an example, the stationary control unit 602 may include multiple Hall effect PCBs that each include a Hall effect sensor that may be activated separately by a magnet in the control device to indicate an individual quantity of the item being ordered or an item to be selected. Each Hall effect sensor may be located behind a logo that indicates the item or quantity being selected. Similarly, multiple RFID readers may be used to indicate an item or quantity to be selected when a control device includes an RFID tag.

Figure 9B:
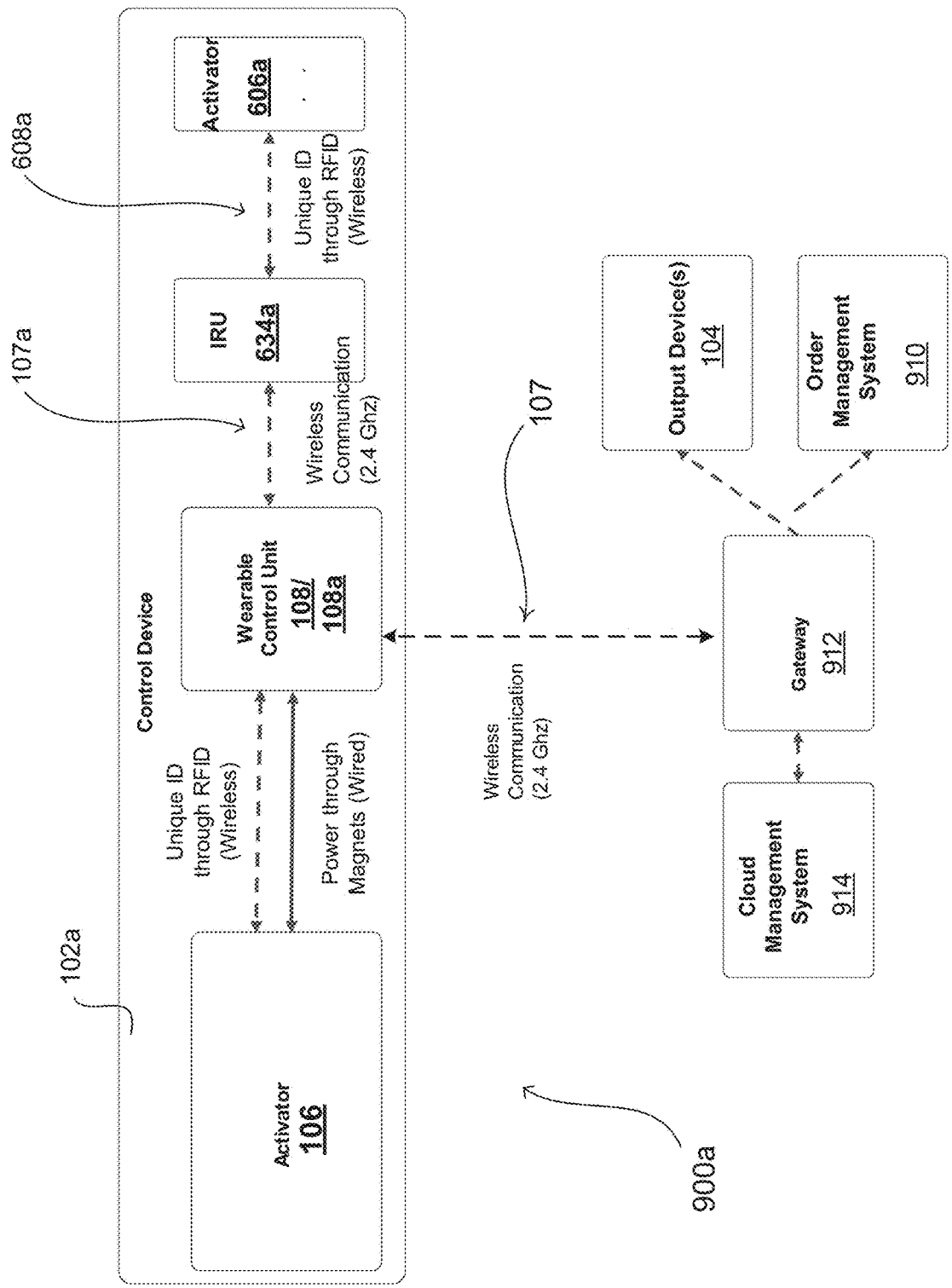
FIG. 9B is a block diagram illustrating another example control system for controlling one or more output devices and/or tracking one or more orders at an order management system.

FIG. 9B is a block diagram illustrating another example control system 900a for controlling one or more output devices 104 and/or tracking one or more orders at an order management system 910. The control system 900a may be similar to the control system 900 of FIG. 9A. The control system 900a may include a wearable control unit, such as the wearable control unit 108 shown in FIG. 2 or the wearable control unit 108a shown in FIG. 5A. The processor 120 of the wearable control unit 108, 108a may receive an input from the input receive unit 634a that includes the unique identifier associated with a user. The unique identifier may be used by the processor 120 of the wearable control unit 108, 108a to check if the user associated with the unique identifier has permission to perform control of the output device 104 that is indicated by the unique identifier of the other activator 106.

The input receiving unit 634a may be an RFID reader that may receive an RFID or other unique identifier associated with a user from an RFID tag or other transmitter included in the activator 606a. The input receiving unit 634a may be external to or integrated in the wearable control unit 108, 108a. The input receiving unit 634a may receive the activator 606a and receive the RFID or other unique identifier of the activator 606a. The RFID or other unique identifier may be transmitted via wireless communication link 608a to the input receive unit 634a. The input receive unit 634a may comprise another communication circuit, such as a transceiver, that is configured to communicate the RFID or other unique identifier to the processor 120 of the wearable control unit 108, 108a via a wireless communication link 107a. The RFID or other unique identifier that is associated with the user may be received by the processor 120 and may be used by the processor 120 to check if the user associated with the unique identifier has permission to perform control of the output device 104, as similarly described with regard to the stationary control unit 602 herein. If the processor 120 of the wearable control unit 108 determines that the user has access to perform control of the output device 104, the processor 120 may allow control of the output device via the flex sensors 138a, 138b. If the processor 120 of the wearable control unit 108a determines that the user has access to perform control of the output device 104, the processor 120 may allow control of the output device via the capacitive touch sensors 173a, 173b. The cloud management system 914 may similarly log the amount of an item that has been dispensed or used by the user in memory while the output device 104 has been activated by the wearable control unit 108, 108a. The order management system 910 may similarly track a number of items that have been ordered via the wearable control unit 108, 108a in memory.

Although features and elements are described herein in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs). Though the devices or units described herein may have particular portions omitted, such as a power source or other portion, it is clear that such portions may be included for operation.

What is claimed:
1. A system comprising:
an activator configured to transmit a first input comprising a unique identifier of a corresponding output device of a plurality of output devices, wherein the activator comprises at least one magnet;
a wearable control unit configured to:
receive the unique identifier from the activator;
determine an output device of the plurality of output devices to be controlled based on the unique identifier;
activate the output device for performing control;
receive a second input configured to control the output device;
generate control instructions configured to control the output device; and
transmit the control instructions to the output device;
wherein the activator is configured to attach to the wearable control unit via the at least one magnet.

2. The system of claim 1, wherein the unique identifier comprises a radio frequency identifier (RFID).

3. The system of claim 1, wherein the wearable control unit comprises at least one magnet configured to generate an electrical current when within proximity to the at least one magnet of the activator and illuminate one or more LEDs on the activator to provide feedback to a user that the unique identifier has been received by the wearable control unit.

4. The system of claim 1, wherein the second input is received from one or more flex sensors of the wearable control unit.

5. The system of claim 4, wherein the second input indicates that the one or more flex sensors have been flexed past a predefined threshold for performing the control of the output device.

6. The system of claim 5, wherein the one or more flex sensors comprise a plurality of flex sensors, wherein the wearable control unit is within a wearable glove, and wherein each flex sensor of the plurality of flex sensors is located in a separate finger portion of the wearable glove.

7. The system of claim 6, wherein the wearable control unit is configured to average a flex value associated with each of the plurality of flex sensors to determine a flex value to be compared to the predefined threshold for performing the control of the output device.

8. The system of claim 7, wherein the predefined threshold is a first threshold that is associated with a first speed or level of control to be performed at the output device.

9. The system of claim 1, wherein the second input is received from one or more capacitive touch sensors to perform control of the output device.

10. The system of claim 9, wherein the wearable control unit is within a wearable hat or wearable headgear, and wherein the capacitive touch sensors are located on opposite sides of the wearable hat or wearable headgear.

11. A system comprising:
an activator configured to transmit a first input comprising a unique identifier of a corresponding output device of a plurality of output devices, wherein the activator comprises at least one magnet;
a control unit configured to:
receive the unique identifier from the activator;
determine an output device of the plurality of output devices to be controlled based on the unique identifier;
activate the output device for performing control;
receive a second input configured to control the output device;
generate control instructions configured to control the output device; and
transmit the control instructions to the output device;
wherein the activator is configured to attach to the control unit via the at least one magnet.

12. The system of claim 11, wherein the activator is a first activator, and wherein the control unit is configured to receive the second input from a second activator in the form of a magnetic field for generating the control instructions to control the output device.

13. The system of claim 12, wherein the control unit comprises a Hall effect sensor configured to indicate when the magnetic field exceeds a predefined value.

14. The system of claim 13, wherein the control unit is configured to receive a third input from a third activator, wherein the third input comprises a unique identifier associated with a user, and wherein the control unit is configured to prevent the control instructions from being generated or transmitted when the unique identifier fails to have an access level to enable control of the output device.

15. The system of claim 14, wherein the output device is a liquid dispenser.

\* \* \* \* \*